Nov. 9, 1937.　　W. T. MURDEN ET AL　　2,098,709
ANTIFRICTION BEARING
Filed June 6, 1936

INVENTORS:
WILLIAM T. MURDEN,
RODGER D. BROUWER,
BY Gales P. Moore
THEIR ATTORNEY.

UNITED STATES PATENT OFFICE 2,098,709

ANTIFRICTION BEARING

William T. Murden and Rodger D. Brouwer, Bristol, Conn., assignors to General Motors Corporation, Detroit, Mich., a corporation of Delaware Application June 6, 1936, Serial No. 83,965

9 Claims. (Cl. 308—236)

This invention relates to antifriction bearings and comprises all of the features of novelty herein disclosed. An object of the invention is to provide improved means for securing a bearing race ring or the like to a support. Another object is to provide an improved locking device which will securely wedge a race ring to a shaft or similar support without distorting the raceway surface or otherwise impairing the performance of the bearing.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is an axial sectional view of a bearing and locking means.

Figure 1:
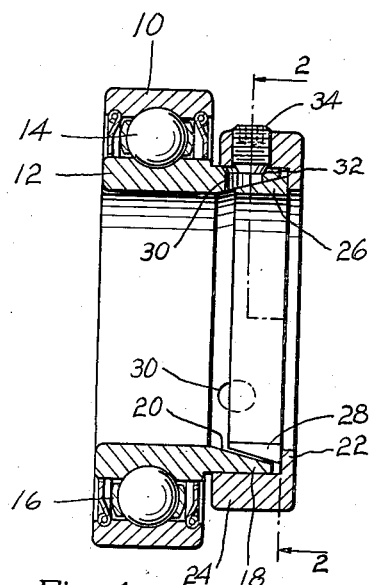
Figure 2:
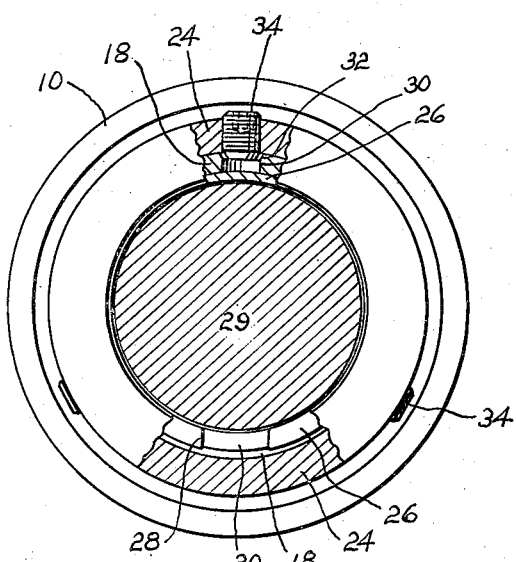
Fig. 2 is a cross sectional view taken on the line 2—2 of Fig. 1.

The bearing comprises an outer race ring 10, an inner race ring 12, and interposed rolling elements 14 spaced by a separator 16, this being merely illustrative of a suitable bearing to which the invention may be applied. When the inner race ring is the part to be secured to a support, it is extended at one end as indicated at 18 and provided with an internal conical wall or taper 20 which increases in diameter toward the end of the race ring, all of such tapering preferably being entirely beyond the plane of the raceway so that clamping forces will not distort the race ring in the region of the raceway.

The internal recess formed by the conical wall is closed at the end by an abutment wall or flange 22 on a sleeve or collar 24 which slidably fits the extension 18 and so reinforces the extension against forces tending to distort it radially. A wedging ring 26 fits in the recess and has a conical outer surface conforming to the conical wall 20, the thick end of the ring abutting against the wall or flange 22. The wedging ring is resilient and inherently expansible, preferably being split as indicated at 28, and such expansive tendency urges it outwardly against the conical wall with an endwise reaction against the abutment wall. In such initial position, the bore of the wedging ring is in substantial alignment with the bore of the race ring so that the assembled structure can be readily slipped onto a shaft 29 or similar support of slightly smaller size.

The extension 18 has a plurality of drilled radial openings 30, preferably three, and each opening is chamfered or countersunk as indicated at 32. The collar 24 has similarly spaced openings which are threaded to receive socket-headed screws 34 whose inner ends are conical. The screws 34 are eccentrically located with respect to the openings 30 by having their axes axially displaced a little from the centers of the openings 30. Hence, when the screws are turned to move them radially inwards, their conical ends engage the coned surfaces 32 at the outermost sides of the openings and act as cams to force the collar 24 axially. This shifts the wedging ring 26 axially and simultaneously contracts it into firm gripping engagement with the shaft. The tendency to expand and distort the extension 18 is resisted by the surrounding collar 24, and the raceways are unaffected by the wedging forces. Hence the locking device is well adapted for use with small bearings whose race rings are thin-walled.

Figure 3:
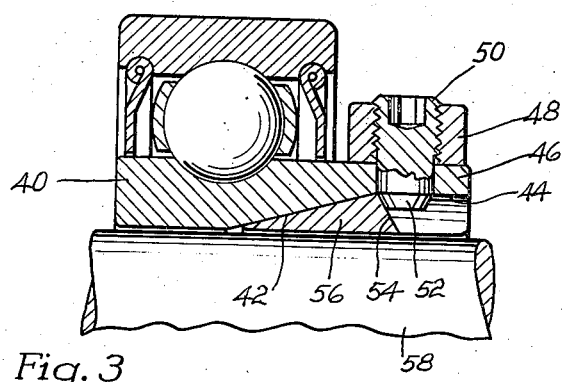
Fig. 3 is an enlarged, axial sectional view of a portion of a bearing and locking means of modified form.

In Fig. 3, an inner race ring 40 has an internal conical wall or taper 42 extending out to a cylindrical wall 44 in an extension 46. Surrounding the extension is a collar 48 having threaded openings for socket-headed screws 50 having coned ends 52. These conical ends engage a tapering surface or wall 54 on a wedging ring 56 which is preferably split and resilient. The wedging ring has a conical outer surface conforming to the conical wall 42. When the screws are turned to shift them radially, inwards, the wedging ring is shifted along the conical wall 42 and wedged against the shaft 58.

We claim:

1. In a device of the character described, a race ring having a raceway formed integrally therewith and a recess beyond the plane of the raceway, a wall of said recess tapering towards the adjacent end of the race ring, a wedging member having a tapering surface conforming to the wall of the recess, a reinforcing sleeve slidably fitting the race ring on a smooth surface opposite to the recess, and means for sliding the sleeve on said smooth surface of the race ring to shift the wedging member axially of the race ring; substantially as described.

2. In a device of the character described, a race ring having a raceway and a recess beyond the plane of the raceway, a wall of the recess tapering towards the adjacent end of the race ring, a wedging member having a tapering surface conforming to the wall of the recess, a reinforcing sleeve slidably fitting the race ring on the surface opposite to the recess, and a plurality of screws threaded in the sleeve and engaging the race ring for shifting the sleeve and the wedging member axially of the race ring; substantially as described.

3. In a device of the character described, a race ring having a raceway and a recess beyond the plane of the raceway, a wall of said recess tapering towards the adjacent end of the race ring, a wedging member having a tapering surface conforming to the wall of the recess, a reinforcing sleeve slidably fitting the race ring on the surface opposite to the recess and having a flange engaging the wedging member, and a plurality of radially movable screws reacting between the race ring and the sleeve for shifting the sleeve and the wedging member axially of the race ring; substantially as described.

4. In a device of the character described, a race ring having a raceway and an axial extension beyond the raceway, the extension having a recess with a tapering wall, a wedging ring having a tapering surface conforming to the tapering wall, a reinforcing sleeve fitting the extension and having a plurality of openings, and means movable in said openings to effect axial movement of the wedging ring in the recess; substantially as described.

5. In a device of the character described, a race ring having a raceway and an axial extension beyond the raceway, the extension having a recess with a tapering wall, a wedging ring having a tapering surface conforming to the tapering wall, a reinforcing sleeve fitting the extension and having a plurality of threaded openings, and screws movable radially in said openings and having conical portions for effecting axial movement of the wedging member in the recess; substantially as described.

6. In a device of the character described, a race ring having a raceway and an axial extension beyond the raceway, the extension having a recess with a tapering wall, a wedging ring having a tapering surface conforming to the tapering wall, a reinforcing sleeve slidably fitting the extension and having a plurality of radial openings, and screws threaded in the openings of the sleeve and having tapered surfaces to engage tapered surfaces on the extension to cam the sleeve axially of the extension; substantially as described.

7. In a device of the character described, a race ring having a raceway and an axial extension beyond the raceway, the extension having a recess with a tapering wall, a wedging ring having a tapering surface conforming to the tapering wall, a reinforcing sleeve fitting the extension and having a plurality of threaded radial openings, the extension having a plurality of radial openings which are displaced with respect to the threaded openings, and screws in the threaded openings and having conical ends adapted to engage the openings in the extension; substantially as described.

8. In a device of the character described, a race ring having a raceway and an axial extension beyond the raceway, the extension having a recess with a tapering wall, a wedging ring having a tapering surface conforming to the tapering wall, and a plurality of screws movable radially of the extension, the wedging ring and the screws having co-operating inclined surfaces for shifting the wedging ring axially in the recess; substantially as described.

9. In a device of the character described, a race ring having a raceway and an axial extension beyond the raceway, the extension having a recess with a tapering wall, a wedging ring having a tapering surface conforming to the tapering wall, a reinforcing sleeve fitting the extension and having a plurality of threaded openings, screws in said threaded openings and extending through openings in the extension, and the ends of said screws having inclined surfaces for shifting the wedging ring axially in the recess; substantially as described.

WILLIAM T. MURDEN.
RODGER D. BROUWER.